United States Patent
Choi et al.

(10) Patent No.: US 11,223,037 B2
(45) Date of Patent: Jan. 11, 2022

(54) METHOD FOR MANUFACTURING ANODE FOR CABLE-TYPE SECONDARY BATTERY, ANODE MANUFACTURED THEREBY, AND CABLE-TYPE SECONDARY BATTERY INCLUDING SAME ANODE

(71) Applicant: LG CHEM, LTD., Seoul (KR)

(72) Inventors: Jung-Hun Choi, Daejeon (KR);
Dong-Hyeon Kang, Daejeon (KR);
Sung-Joong Kang, Daejeon (KR);
Byoung-Kuk Son, Daejeon (KR);
In-Sung Uhm, Daejeon (KR);
Dong-Chan Lee, Daejeon (KR);
Yong-Hee Lee, Daejeon (KR);
Min-Chul Jang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 201 days.

(21) Appl. No.: 16/606,389

(22) PCT Filed: Aug. 31, 2018

(86) PCT No.: PCT/KR2018/010185
§ 371 (c)(1),
(2) Date: Oct. 18, 2019

(87) PCT Pub. No.: WO2019/045534
PCT Pub. Date: Mar. 7, 2019

(65) Prior Publication Data
US 2021/0111393 A1 Apr. 15, 2021

(30) Foreign Application Priority Data
Sep. 1, 2017 (KR) .................. 10-2017-0112133

(51) Int. Cl.
*H01M 4/139* (2010.01)
*H01M 4/04* (2006.01)
(Continued)

(52) U.S. Cl.
CPC .......... *H01M 4/139* (2013.01); *H01M 4/043* (2013.01); *H01M 4/0404* (2013.01);
(Continued)

(58) Field of Classification Search
CPC .... H01M 4/139; H01M 4/0404; H01M 4/043; H01M 4/628; H01M 4/75;
(Continued)

(56) References Cited

U.S. PATENT DOCUMENTS

2003/0008213 A1* 1/2003 Cho .................... H01M 10/058
429/231.95
2006/0242824 A1* 11/2006 Varkey ................... H01B 13/26
29/825
(Continued)

FOREIGN PATENT DOCUMENTS

KR 10-2000-0055681 A 9/2000
KR 10-2013-0069490 A 6/2013
(Continued)

OTHER PUBLICATIONS

International Search Report (PCT/ISA/210) issued in PCT/KR2018/010185, dated Dec. 20, 2018.
(Continued)

*Primary Examiner* — Maria Laios
*Assistant Examiner* — Adam J Francis
(74) *Attorney, Agent, or Firm* — Birch, Stewart, Kolasch & Birch, LLP

(57) ABSTRACT

A method for manufacturing an anode for a cable-type secondary battery, includes forming a lithium-containing electrode layer on the outer surface of a wire-type current collector; and surrounding the outer surface of the lithium-containing electrode layer with a substrate for forming a polymer layer spirally, and pressing the outside of the substrate for forming a polymer layer to form a polymer (Continued)

layer on the lithium-containing electrode layer, wherein the polymer layer includes a hydrophobic polymer, an ion conductive polymer, and a binder for binding the hydrophobic polymer and the ion conductive polymer with each other. An anode obtained from the method and a cable-type secondary battery including the anode are also provided.

12 Claims, 5 Drawing Sheets

(51) Int. Cl.
| | | |
|---|---|---|
| *H01M 4/62* | (2006.01) | |
| *H01M 4/75* | (2006.01) | |
| *H01M 10/04* | (2006.01) | |
| *H01M 10/052* | (2010.01) | |
| *H01M 10/0587* | (2010.01) | |
| *H01M 4/02* | (2006.01) | |

(52) U.S. Cl.
CPC .............. *H01M 4/628* (2013.01); *H01M 4/75* (2013.01); *H01M 10/0422* (2013.01); *H01M 10/0431* (2013.01); *H01M 10/052* (2013.01); *H01M 10/0587* (2013.01); *H01M 2004/021* (2013.01); *H01M 2004/025* (2013.01); *H01M 2004/027* (2013.01)

(58) Field of Classification Search
CPC ......... H01M 10/0422; H01M 10/0431; H01M 10/052; H01M 10/0587; H01M 2004/021; H01M 2004/025; H01M 2004/027; H01G 11/28; H01G 11/72; H01B 13/08; H01B 13/0816; H01B 13/26
See application file for complete search history.

(56) References Cited

U.S. PATENT DOCUMENTS

| | | | | |
|---|---|---|---|---|
| 2013/0326865 | A1* | 12/2013 | Kobayashi | ............ H01M 4/139 |
| | | | | 29/623.1 |
| 2014/0178727 | A1 | 6/2014 | Kwon et al. | |
| 2014/0377613 | A1 | 12/2014 | Kwon et al. | |
| 2014/0377616 | A1* | 12/2014 | Kwon | ............... H01M 10/0569 |
| | | | | 429/94 |
| 2018/0166682 | A1 | 6/2018 | Lee et al. | |
| 2018/0205043 | A1* | 7/2018 | Kwon | ................. H01M 10/058 |

FOREIGN PATENT DOCUMENTS

| | | |
|---|---|---|
| KR | 10-2014-0000233 A | 1/2014 |
| KR | 10-2014-0029840 A | 3/2014 |
| KR | 10-2014-0132289 A | 11/2014 |
| KR | 10-2014-0132294 A | 11/2014 |
| KR | 10-2016-0033608 A | 3/2016 |
| KR | 10-2016-0059531 A | 5/2016 |
| KR | 10-2017-0028111 A | 3/2017 |
| KR | 10-1735513 B1 | 5/2017 |
| KR | 10-2017-0061450 A | 6/2017 |
| KR | 10-1766871 B1 | 8/2017 |
| KR | 10-1771292 B1 | 8/2017 |
| KR | 10-2016-0112266 A | 9/2018 |

OTHER PUBLICATIONS

Extended European Search Report, dated May 4, 2020, for European Application No. 18852106.6.

* cited by examiner

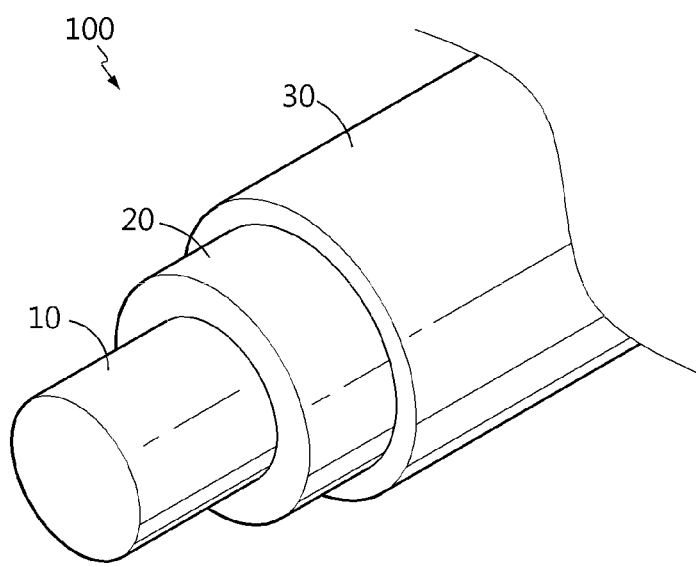
FIG. 5
FIG. 6
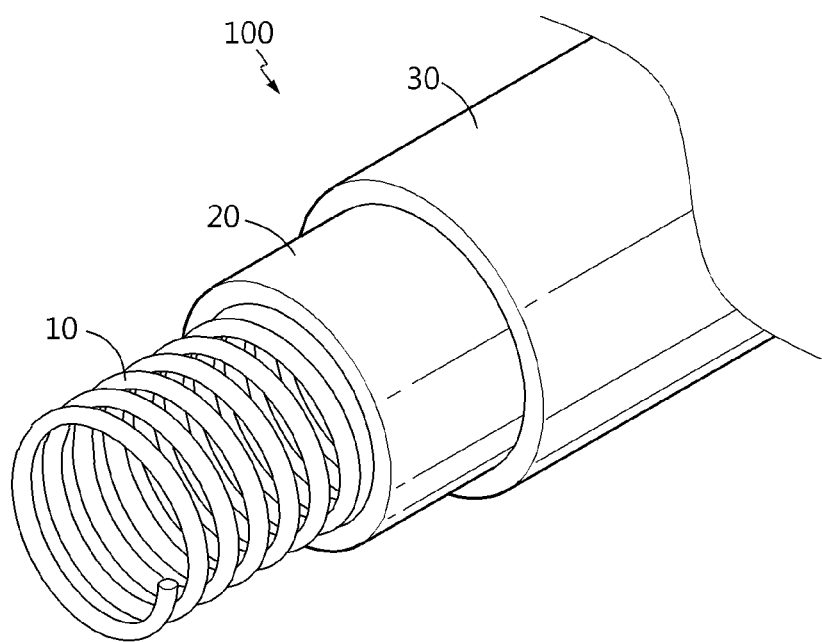

METHOD FOR MANUFACTURING ANODE FOR CABLE-TYPE SECONDARY BATTERY, ANODE MANUFACTURED THEREBY, AND CABLE-TYPE SECONDARY BATTERY INCLUDING SAME ANODE

TECHNICAL FIELD

The present disclosure relates to a method for manufacturing an anode for a cable-type secondary battery, an anode obtained therefrom, and a cable-type secondary battery including the anode.

The present application claims priority to Korean Patent Application No. 10-2017-0112133 filed on Sep. 1, 2017 in the Republic of Korea, the disclosures of which are incorporated herein by reference.

BACKGROUND ART

As technological development and a demand for mobile instruments have been increased, rechargeable secondary batteries which can be downsized and can be provided with high capacity have been increasingly in demand. In addition, among such secondary batteries, lithium secondary batteries having high energy density and voltage have been commercialized and used widely.

Lithium secondary batteries are provided largely in the form of cylindrical batteries, prismatic batteries or pouch-type batteries. In general, a secondary battery is obtained by installing an electrode assembly including an anode, a cathode and a separator inside of a cylindrical or prismatic metallic can or a pouch-type casing made of an aluminum laminate sheet, and injecting an electrolyte to the electrode assembly. Therefore, a predetermined space for installing the secondary battery is required essentially, and such cylindrical, prismatic or pouch-like shapes of secondary batteries undesirably function as a limitation in developing portable systems having various shapes. Thus, there has been a need for developing a novel type of secondary battery which allows easy deformation. To meet such a need, there has been suggested a cable-type secondary battery having a significantly high ratio of length to sectional diameter.

A cable-type secondary battery has a linear structure which has a predetermined shape of horizontal section and is elongated along the longitudinal direction based on the horizontal section, and allows free deformation by virtue of its flexibility. Such a cable-type secondary battery includes an electrode having an electrode active material layer around the circumference of a wire-type current collector.

In general, when using lithium metal as an electrode active material, lithium metal rapidly reacts with moisture to form LiOH, thereby causing degradation of processability. Particularly, it is required to expose a lithium-containing electrode layer for 30 minutes or more in a dry room in order to apply the lithium-containing electrode layer to a cable-type secondary battery. For this, it is preferred to form a polymer protective layer in order to interrupt moisture. However, such a polymer protective layer can interrupt moisture but cannot transport lithium ions, thereby making it to drive a battery.

Therefore, it is required to develop a method for improving transport of lithium ions while protecting lithium metal from moisture, when applying a lithium-containing electrode layer to a cable-type secondary battery.

DISCLOSURE

Technical Problem

The present disclosure is designed to solve the problems of the related art, and therefore the present disclosure is directed to providing a method for forming a polymer layer, which satisfies protection from moisture simultaneously with smooth transport of lithium ions, efficiently on the outer surface of a lithium-containing electrode layer, when applying the electrode layer during the manufacture of an anode for a cable-type secondary battery.

The present disclosure is also directed to providing an anode for a cable-type secondary battery obtained by the method.

In addition, the present disclosure is directed to providing a cable-type secondary battery including the anode.

Technical Solution

In one aspect of the present disclosure, there is provided a method for manufacturing an anode for a cable-type secondary battery according to any one of the following embodiments.

According to the first embodiment of the present disclosure, there is provided a method for manufacturing an anode for a cable-type secondary battery, including the steps of:

forming a lithium-containing electrode layer on the outer surface of a wire-type current collector; and surrounding the outer surface of the lithium-containing electrode layer with a spirally wound substrate for forming a polymer layer, and pressing the outside of the substrate for forming a polymer layer to form a polymer layer on the lithium-containing electrode layer, wherein the polymer layer includes a hydrophobic polymer, an ion conductive polymer, and a binder for binding the hydrophobic polymer and the ion conductive polymer with each other.

According to the second embodiment of the present disclosure, there is also provided a method for manufacturing an anode for a cable-type secondary battery, including the steps of:

forming a lithium-containing electrode layer on the outer surface of a wire-type current collector:

surrounding the outer surface of the lithium-containing electrode layer with a spirally wound transfer film, wherein the transfer film has a release film and a polymer layer formed on one surface of the release film, and the polymer layer is in contact with the outer surface the lithium-containing electrode layer;

pressing the outside of the transfer film to transfer the polymer layer to the lithium-containing electrode layer; and removing the release film, wherein the polymer layer comprises a hydrophobic polymer, an ion conductive polymer, and a binder for binding the hydrophobic polymer and the ion conductive polymer with each other.

According to the third embodiment, there is provided the method for manufacturing an anode for a cable-type secondary battery as defined in the first embodiment, wherein the substrate for forming a polymer layer is a transfer film having a release film and a polymer layer formed on one surface of the release film; or a polymer layer film.

According to the fourth embodiment, there is provided the method for manufacturing an anode for a cable-type secondary battery as defined in the first or the second embodiment, wherein the pressing is carried out by at least one of top-to-bottom pressing, multi-lateral pressing, shrinking tube-inserted pressing.

According to the sixth embodiment, there is provided the method for manufacturing an anode for a cable-type secondary battery as defined in the fourth embodiment, including rotating the wire-type current collector surrounded with the substrate for forming a polymer layer around the longitudinal direction of the wire-type current collector as a rotation axis, while carrying out the multi-lateral pressing.

According to the seventh embodiment, there is provided the method for manufacturing an anode for a cable-type secondary battery as defined in the sixth embodiment, wherein the multi-lateral pressing is carried out by co-rotating at least one press member that is in contact with the outer surface of the substrate for forming a polymer layer.

According to the eighth embodiment, there is provided the method for manufacturing an anode for a cable-type secondary battery as defined in the seventh embodiment, wherein one or more press members are spaced apart from each other at the same interval.

According to the ninth embodiment, there is provided the method for manufacturing an anode for a cable-type secondary battery as defined in any one of the first to the eighth embodiments, wherein the pressing is carried out at a temperature of 80-100° C. under a pressure of 1.0-1.5 kg/cm$^2$.

According to the tenth embodiment, there is provided the method for manufacturing an anode for a cable-type secondary battery as defined in any one of the first to the ninth embodiments, wherein the polymer layer has a thickness of 0.1-20 μm.

According to the eleventh embodiment, there is provided the method for manufacturing an anode for a cable-type secondary battery as defined in any one of the first to the tenth embodiments, wherein the weight ratio of the hydrophobic polymer to the ion conductive polymer is 10:90 to 90:10.

According to the twelfth embodiment, there is provided the method for manufacturing an anode for a cable-type secondary battery as defined in any one of the first to the eleventh embodiments, wherein the binder is used in an amount of 0.1-2 parts by weight based on 100 parts by weight of the total weight of the polymer layer.

According to the thirteenth embodiment, there is provided the method for manufacturing an anode for a cable-type secondary battery as defined in any one of the first to the twelfth embodiments, wherein the hydrophobic polymer is selected from polydimethylsiloxane (PDMS), polyacrylonitrile (PAN), polytetrafluoroethylene (PTFE), polychlorotrifluoroethylene (PCTFE) and a combination thereof.

According to the fourteenth embodiment, there is provided the method for manufacturing an anode for a cable-type secondary battery as defined in any one of the first to the thirteenth embodiments, wherein the ion conductive polymer is selected from polyvinylidene fluoride-hexafluoropropylene (PVDF-HFP), polyvinyl fluoride (PVF), polyvinylidene fluoride (PVDF), polymethyl methacrylate (PMMA), polyethylene oxide (PEO) and a combination thereof.

According to the fifteenth embodiment, there is provided the method for manufacturing an anode for a cable-type secondary battery as defined in the third embodiment, wherein the release film is made of polyethylene terephthalate (PET).

In another aspect of the present disclosure, there is provided an anode for a cable-type secondary battery according to any one of the following embodiments.

According to the sixteenth embodiment, there is provided an anode for a cable-type secondary battery, including:
a wire-type current collector;
a lithium-containing electrode layer formed on the outer surface of the wire-type current collector; and
a polymer layer formed on the outer surface of the lithium-containing electrode layer,
wherein the polymer layer includes a hydrophobic polymer, an ion conductive polymer, and a binder for binding the hydrophobic polymer and the ion conductive polymer with each other, and has an ion conductivity of $1 \times 10^{-2}$ to $1 \times 10^{-6}$ S/cm.

According to the seventeenth embodiment, there is provided the anode for a cable-type secondary battery as defined in the sixteenth embodiment, wherein the weight ratio of the hydrophobic polymer to the ion conductive polymer is 10:90 to 90:10.

In still another aspect of the present disclosure, there is provided a cable-type secondary battery according to any one of the following embodiments.

According to the eighteenth embodiment, there is provided a cable-type secondary battery, including:
an internal electrode extended along the longitudinal direction;
a separator layer formed to surround the internal electrode; and
an external electrode formed to surround the outer surface of the separator layer,
wherein the anode is any one of the internal electrode and the external electrode.

According to the nineteenth embodiment, there is provided the cable-type secondary battery as defined in the eighteenth embodiment, wherein when the anode is the internal electrode, the anode is a linear wire-type anode or a wound wire-type anode having an open structure.

According to the twentieth embodiment, there is provided the cable-type secondary battery as defined in the eighteenth or the nineteenth embodiment, wherein when the anode is the external electrode, the anode is wound spirally on the outside of the separator layer, or two or more anodes are disposed in parallel with each other on the outside of the separator layer in the longitudinal direction.

Advantageous Effects

According to the present disclosure, a lithium-containing electrode layer formed on the outer surface of a wire-type current collector is surrounded with a substrate for forming a polymer layer, and then pressing is carried out to form a polymer layer. Thus, it is possible to obtain an anode for a cable-type secondary battery which allows smooth transport of lithium ions while protecting the lithium-containing electrode layer from moisture.

DESCRIPTION OF DRAWINGS

FIG. 5 is a schematic view illustrating a cable-type secondary battery wherein the anode according to an embodiment of the present disclosure is used as an internal electrode in the form of a linear wire-type anode.

FIG. 6 is a schematic view illustrating a cable-type secondary battery wherein the anode according to an embodiment of the present disclosure is used as an internal electrode in the form of a wound wire-type anode.

BEST MODE

Figure 1:
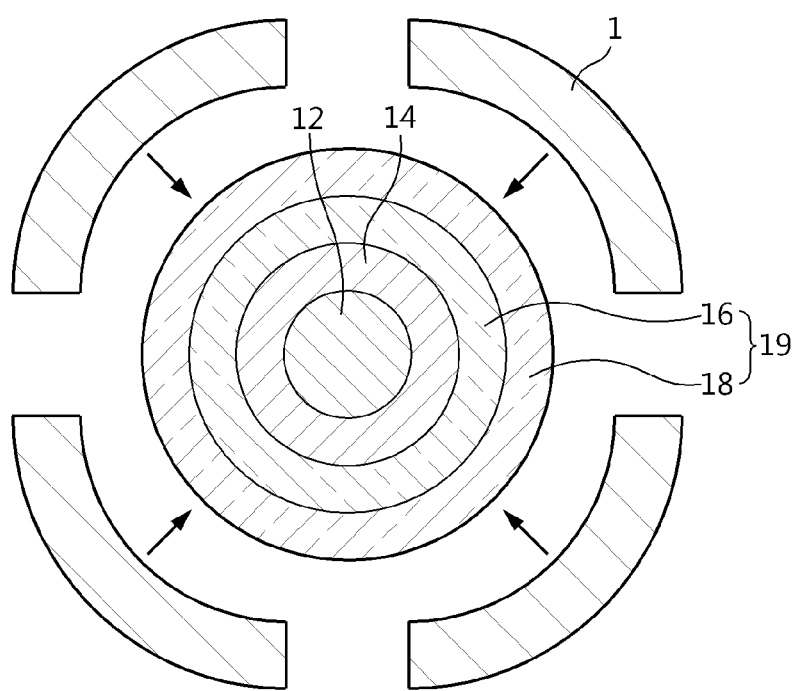
FIG. 1 illustrates the method for manufacturing an anode for a cable-type secondary battery according to an embodiment of the present disclosure, wherein tetra-lateral pressing is carried out.

Hereinafter, the present disclosure will be described in detail with reference to the accompanying drawings. It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

In addition, it should be understood that the examples described in the specification and the structures depicted in the drawings are just preferable examples for the purpose of illustrations only, not intended to limit the scope of the disclosure, so it should be understood that other equivalents and modifications could be made thereto without departing from the scope of the disclosure.

In one aspect, there is provided a method for manufacturing an anode for a cable-type secondary battery, including the steps of:

forming a lithium-containing electrode layer on the outer surface of a wire-type current collector; and surrounding the outer surface of the lithium-containing electrode layer with a substrate for forming a polymer layer spirally, and pressing the outside of the substrate for forming a polymer layer to form a polymer layer on the lithium-containing electrode layer, wherein the polymer layer includes a hydrophobic polymer, an ion conductive polymer, and a binder for binding the hydrophobic polymer and the ion conductive polymer with each other.

In another aspect, there is also provided a method for manufacturing an anode for a cable-type secondary battery, including the steps of:

forming a lithium-containing electrode layer on the outer surface of a wire-type current collector;

surrounding the outer surface of the lithium-containing electrode layer with a transfer film spirally, wherein the transfer film has a release film and a polymer layer formed on one surface of the release film, and the polymer layer is in contact with the outer surface the lithium-containing electrode layer;

pressing the outside of the transfer film to transfer the polymer layer to the lithium-containing electrode layer; and removing the release film, wherein the polymer layer comprises a hydrophobic polymer, an ion conductive polymer, and a binder for binding the hydrophobic polymer and the ion conductive polymer with each other.

FIG. 1 illustrates the method for manufacturing an anode for a cable-type secondary battery according to an embodiment of the present disclosure. Hereinafter, the method for manufacturing an anode for a cable-type secondary battery according to the present disclosure will be described with reference to FIG. 1.

First, a lithium-containing electrode layer 14 is formed so that it may surround the outer surface of a wire-type current collector 12 (S1).

The wire-type current collector may be made of stainless steel, aluminum, nickel, titanium, baked carbon, copper; stainless steel surface-treated with carbon, nickel, titanium or silver; aluminum-cadmium alloy; a non-conductive polymer surface-treated with a conductive material; or a conductive polymer. Typically, the wire-type current collector is made of copper.

In addition, the lithium-containing electrode layer may be coated with a lithium-based active material to realize high capacity. To carry out the coating, conventional coating processes may be used. Particularly, electroplating or lamination processes may be used. The lithium-containing electrode layer 14 may have a thickness of 1-200 μm. When the above-defined thickness range is satisfied, it is possible to ensure the electroconductivity of an anode capable of realizing the capacity of a battery and to inhibit degradation of the performance of a battery caused by high resistance of an electrode having an excessively large thickness.

Particular examples of the lithium-based active material may include any one selected from lithium, lithium oxides, lithium alloys and lithium alloy oxides. Particularly, lithium or two or more lithium alloys may be used.

Meanwhile, a substrate for forming a polymer layer (not shown) is prepared (S2).

According to an embodiment of the present disclosure, the substrate for forming a polymer layer may be a transfer film having a release film and a polymer layer formed on one surface of the release film; or a polymer layer film.

When the substrate for forming a polymer layer is a transfer film, the polymer layer 16 of the transfer film is allowed to surround the outer surface of the lithium-containing electrode layer spirally so that it may be in contact with the lithium-containing electrode layer. Then, pressing is carried out to form the polymer layer of the transfer film on the outer surface of the lithium-containing electrode layer through a transfer process. Then, a step of removing the release film 18 may be carried out.

In addition, when the substrate for forming a polymer layer is a polymer layer film, it includes a polymer layer itself without any additional release film. Thus, it is possible to form a polymer layer by surrounding the outer surface of the lithium-containing electrode layer spirally with the polymer layer film. Thus, the step of removing a release film may be eliminated.

According to an embodiment of the present disclosure, when the substrate for forming a polymer layer is a transfer film, the release film 18 may include any one selected from the group consisting of polyethylene terephthalate (PET), oriented polypropylene, polyvinyl chloride and polyethylene, or a combination of two or more of them.

According to an embodiment of the present disclosure, the polymer layer of the substrate for forming a polymer layer may be obtained by mixing a hydrophobic polymer with a curing agent, adding an ion conductive polymer thereto, agitating and dissolving the resultant mixture in a solvent, such as toluene, acetone or dimethoxyethane (DME), and drying the resultant solution at a temperature of 60° C. or more. The agitation and drying may be carried out by the conventional methods. Herein, during the drying, curing may occur due to the curing agent. Thus, a catalyst may be added, besides the above-mentioned ingredients, to accelerate the curing. The resultant polymer layer according to the present disclosure includes a hydrophobic polymer, an ion conductive polymer and a binder which fixes and interconnects the hydrophobic polymer and the ion conductive polymer. Herein, the binder may be a curing agent, which is a starting material for preparing the polymer layer or a mixture of the cured products of the curing agent. Otherwise, the binder may include the cured products of the curing agent alone. Therefore, the content of the binder contained in the finished polymer layer may be the same as the content of the curing agent, which is a starting material used for preparing the polymer layer.

The content of the binder may be 0.1-2 parts by weight, 0.15-1.9 parts by weight, or 0.2-1.8 parts by weight, based on 100 parts by weight of the total weight of the composition for preparing the polymer layer.

According to the present disclosure, the hydrophobic polymer is a polymer having low affinity to water, and functions to protect the lithium-containing electrode layer from moisture.

According to an embodiment of the present disclosure, the hydrophobic polymer is a polymer having significantly low hydrophilicity, and may have a water contact angle of 800 or more, particularly 80-170°. The water contact angle is an index indicating the affinity to water of a material. When a material has a water contact angle of 80 or more, the material is regarded as a hydrophobic material. The water contact angle may be determined by preparing a material to be tested in the form of a thin film, and measuring the water contact angle by using a contact angle tester (e.g. Theta, Biolin Scientific) approximately 1 minute after dropping water drops thereto.

Typical examples of the hydrophobic polymer include polydimethylsiloxane (PDMS) (water contact angle: 105.1°), polyacrylonitrile (PAN) (water contact angle: 82°), polytetrafluoroethylene (PTFE) (water contact angle: 100°), polychlorotrifluoroethylene (PCTFE) (water contact angle: 90°) and a combination thereof. Among them, polydimethylsiloxane is preferred in terms of high hydrophobicity.

Meanwhile, the ion conductive polymer contained in the polymer layer is swelled into an electrolyte when the electrode layer is in contact with the electrolyte layer, and thus functions to improve lithium ion conductivity.

According to an embodiment of the present disclosure, the ion conductive polymer may have an ion conductivity of $10^{-6}$ to $10^{-1}$ S/cm. When the ion conductive polymer has an ion conductivity within the above-defined range, it is suitable for driving a battery and it allows realization of an anode capable of conducting lithium ions sufficiently.

Typical examples of the ion conductive polymer include polyvinylidene fluoride-hexafluoropropylene (PVDF-HFP) (ion conductivity: $1\times10^{-3}$), polyvinyl fluoride (PVF) (ion conductivity: $2\times10^{-4}$), polyvinylidene fluoride (PVDF) (ion conductivity: $5.3\times10^{-4}$), polymethyl methacrylate (PMMA) (ion conductivity: $2.1\times10^{-5}$), polyethylene oxide (PEO) (ion conductivity: $4.2\times10^{-5}$) and a combination thereof. Among them, polyvinylidene fluoride-hexafluoropropylene is preferred in terms of ion conductivity.

The weight ratio of the hydrophobic polymer to the ion conductive polymer may be 10:90-90:10, 10:90-70:30, or 10:90-50:50. Within the above-defined range, it is possible to improve water protecting property and lithium ion conductivity.

According to the present disclosure, a binder capable of binding the hydrophobic polymer and the ion conductive polymer with each other is used when forming the polymer layer of the substrate for forming a polymer layer.

As described above, the binder may be a curing agent which is a starting material for preparing the polymer layer or a mixture of cured products formed by the curing agent, or may include the cured products of the curing agent, alone.

The curing agent functions to bind the hydrophobic polymer with the ion conductive polymer.

Non-limiting examples of the curing agent may include a silicone-based curing agent.

The silicone-based curing agent is a single molecule or oligomer having two or more —Si—H groups capable of hydrosilylation with a curable functional group of a silicone polymer, and can be activated by heat or UV to perform hydrosilylation. Particularly, a curing agent having siloxane repeating units shows high compatibility with a silicone polymer to provide an effect of facilitating application of an adhesive composition. The silicone-based curing agent may be a non-isocyanate type silicon-based curing agent.

According to an embodiment of the present disclosure, the silicone-based curing agent may include the following Chemical Formula 1, Chemical Formula 2 and Chemical Formula 3.

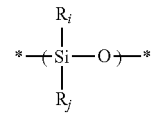

[Chemical Formula 1]

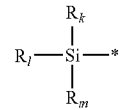

[Chemical Formula 2]

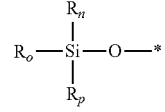

[Chemical Formula 3]

(In Chemical Formula 1 to Chemical Formula 3, * represents a linking site of an element, each of $R_i$, $R_j$, $R_k$, $R_l$, $R_m$, $R_n$, $R_o$ and $R_p$ independently represents H, a C1-C10 alkyl group, C6-C20 aryl group or a silyloxy group, and at least one or at least two of $R_i$, $R_j$, $R_k$, $R_l$, $R_m$, $R_n$, $R_o$ and $R_p$ represent H). The term 'silyloxy group' means a —Si—O group having a C1-C10 alkyl group or H. Particularly, the silicone curing agent may include at least one repeating unit represented by Chemical Formula 1 together with Chemical Formula 2 and Chemical Formula 3 at the ends thereof.

The silicone-based curing agent may include at least one of silane compounds and siloxane compounds.

For example, the silicone-based curing agent may be represented by the following Chemical Formula 4, and particularly may include a copolymer of dimethylsiloxane with methylhydrosiloxane.

[Chemical Formula 4]

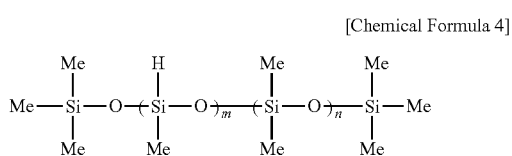

(In Chemical Formula 4, Me represents methyl group, and each of in and ii represents $0<m\leq=0.5$ and $0.5<n\leq=1$). According to an embodiment f the present disclosure, the silicone-based curing agent may be hydrogen silane.

For example, the silicone-based curing agent may be hydrogen silane represented by the following general formula.

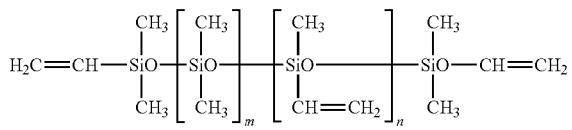

(wherein m is an integer of 1-1,000, and n is an integer of 1-10,000).

The curing agent may be a compound having an average viscosity of about 100-10,000 cps, but is not limited thereto.

The content of the curing agent may be 0.1-2 parts by weight, 0.15-1.9 parts by weight, or 0.2-1.8 parts by weight, based on 100 parts by weight of the total weight of the composition for forming a polymer layer.

When the polymer layer including the hydrophobic polymer and the ion conductive polymer is provided on the lithium-containing electrode, it may protect lithium metal from moisture and conduct lithium ions while being swelled in an electrolyte, and thus enhances the safety and chemical stability of the lithium-containing electrode layer. In addition, the polymer layer, which is a polymer mixture coating layer, inhibits formation of a solid electrolyte interface (SEI) layer caused by the reaction of the electrode layer with the electrolyte, and thus can inhibit resistance derived from the SEI layer and reduce the interfacial resistance.

The polymer layer may have a thickness of 0.01-20 μm, particularly 0.1-0.5 μm. When the thickness of the polymer layer satisfies the above-defined range, it is possible to prevent an increase in the resistance of a battery and a problem of growth of dendrite of lithium metal.

Then, the outer surface of the lithium-containing electrode layer 14 is surrounded with the substrate for forming a polymer layer spirally so that it may be in contact with the polymer layer 16, and the outside of the substrate for forming a polymer layer is pressed to transfer the polymer layer to the lithium-containing electrode layer (S3).

The pressing may be carried out by top-to-bottom pressing, multi-lateral pressing, or shrinking tube-inserted pressing.

Particularly, the pressing may be carried out by using a pressing member. The pressing member is not particularly limited, as long as it can apply pressure to transfer the polymer layer to the lithium-containing electrode layer. For example, the pressing member may have a "U"-shaped section to pressurize the outside of the substrate for forming a polymer layer, or may have a semi-spherical or roll shape.

According to an embodiment of the present disclosure, the multi-lateral pressing refers to pressing the outside of the substrate for forming a polymer layer by using three or more pressing members. For example, the multi-lateral pressing may include tri-lateral pressing, tetra-lateral pressing, hexa-lateral pressing, or the like.

Particularly, FIG. 1 illustrates an embodiment of tetra-lateral pressing. As shown in FIG. 1, in the case of tetra-lateral pressing using a tetra-lateral press system 1, there is an advantage in that uniform pressure is applied to the outside of the substrate for forming a polymer layer. For example, the lithium-containing electrode layer 14 formed on the outer surface of the wire type current collector 12 is surrounded with the transfer film 19 having the release film 18 and the polymer layer 16 formed on one surface thereof, and then the tetra-lateral press 1 is used to perform pressing from four lateral sides. In this case, the polymer layer coated on the release film can be transferred to the lithium-containing electrode layer under uniform pressure. As a result, it is possible to obtain an anode having a uniform thickness.

The pressing may be carried out at 60-120° C., preferably 80-100° C., under a pressure of 0.5-2 kg/cm$^2$, preferably 1.0-1.5 kg/cm$^2$. When the pressing satisfies the above-defined condition, it is possible to facilitate formation of the polymer layer on the electrode layer.

According to an embodiment of the present disclosure, while the multi-lateral pressing is carried out, the wire-type current collector surrounded with the substrate for forming a polymer layer may be rotated around the longitudinal direction of the wire-type current collector as a rotation axis. This is illustrated in FIG. 2.

Figure 2:
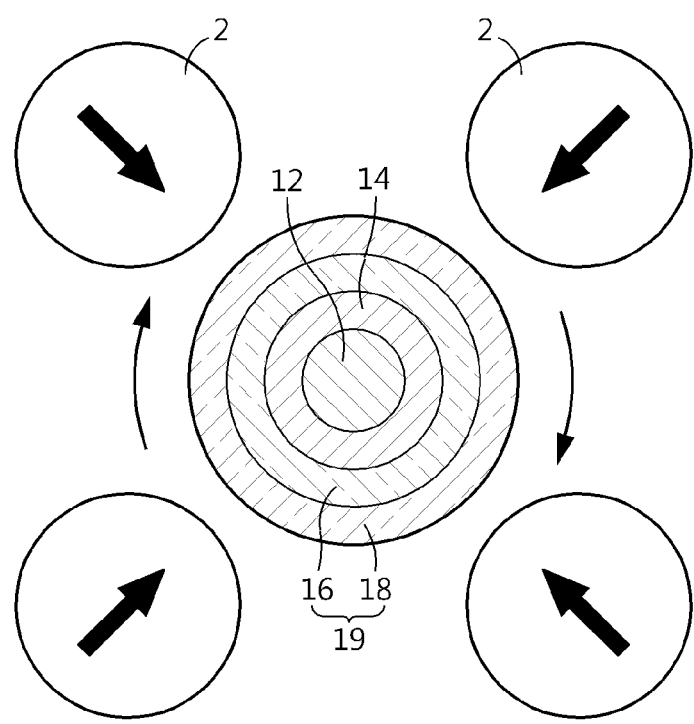
FIG. 2 is a schematic view illustrating the method for manufacturing an anode for a cable-type secondary battery according to an embodiment of the present disclosure.

As shown in FIG. 2, it is possible to apply the polymer layer 16 uniformly onto the lithium-containing electrode layer 14 by applying pressure thereto uniformly through the rotation of an object to be rotated, and thus to carry out a continuous process.

Particularly, the multi-lateral pressing may be carried out by co-rotating one or more roll members 2 which are in contact with the outside of the substrate for forming a polymer layer. When using the rotating roll members, the object to be pressed is co-rotated, and thus any additional device is not required.

According to an embodiment of the present disclosure, the roll members may be spaced apart from each other at a different interval or the same interval. When the roll members are spaced apart from each other at the same interval, it is possible to apply pressure uniformly to the object to be pressed, and thus to apply the polymer layer uniformly. Meanwhile, even when the roll members are spaced apart from each other at a different interval, multiple times of rotation allows uniform application of a polymer layer since the polymer layer is transferred while the wire-type current collector is rotated.

According to an embodiment of the present disclosure, when four roll members are used, they may be spaced apart from each other uniformly at an interval of 90° around the rotation axis. When three roll members are used, they may be spaced apart from each other uniformly at an interval of 120° around the rotation axis.

As described above, when the substrate for forming a polymer layer is a transfer film, the polymer layer of the transfer film is formed on the outer surface of the lithium-containing electrode layer through a transfer process, and then a step of removing the release film may be carried out. In a variant, when the substrate for forming a polymer layer is a polymer layer film, it includes the polymer layer itself without any additional release film. Thus, the outer surface of the lithium-containing electrode layer is surrounded with the polymer layer film spirally and pressing is carried out to form the polymer layer, and thus the step of removing the release film may be eliminated.

The obtained anode for a cable-type secondary battery facilitates conduction of lithium ions while protecting the lithium-containing electrode layer from moisture.

Figure 3:
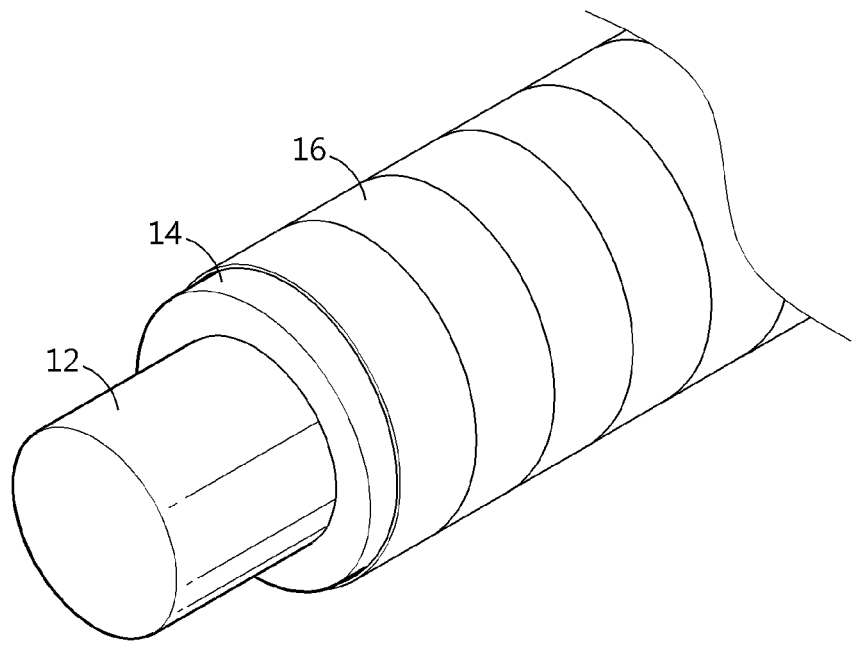
FIG. 3 is a schematic view illustrating the method for manufacturing an anode for a cable-type secondary battery according to another embodiment of the present disclosure.

Therefore, in another aspect, there is provided an anode for a cable-type secondary battery obtained by the above-described method. FIG. 3 is a schematic view of the anode and FIG. 4 is a sectional view of FIG. 3.

Figure 4:
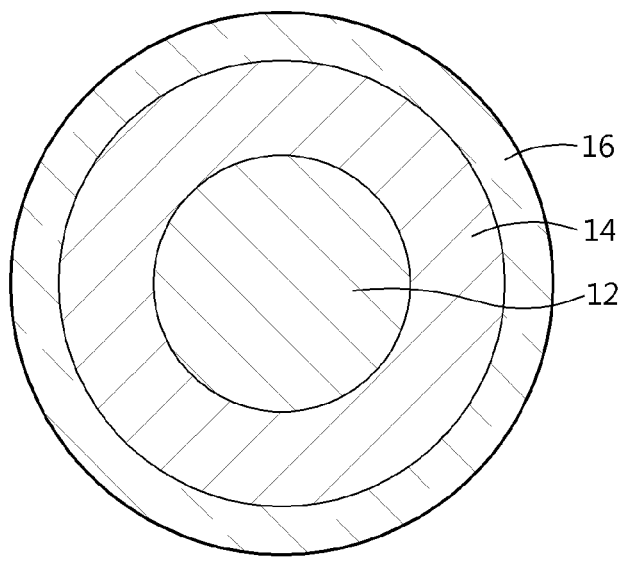
FIG. 4 is a sectional view illustrating the anode for a cable-type secondary battery according to an embodiment of the present disclosure.

Referring to FIG. 3 and FIG. 4, the anode 10 for a cable-type secondary battery according to an embodiment of the present disclosure includes a wire-type current collector 12, a lithium-containing electrode layer 14 formed on the outer surface of the wire-type current collector 12, and a polymer layer 16 formed on the outer surface of the lithium-containing electrode layer 14.

The polymer layer includes a hydrophobic polymer, an ion conductive polymer and a binder which fixes and interconnects the hydrophobic polymer and the ion conductive polymer.

In the polymer layer, the content of the binder may be 0.1-2 parts by weight, 0.15-1.9 parts by weight, or 0.2-1.8 parts by weight, based on 100 parts by weight of the total weight of the composition for preparing the polymer layer.

The weight ratio of the hydrophobic polymer to the ion conductive polymer may be 10:90-90:10, 10:90-70:30, or 10:90-50:50. Within the above-defined range, it is possible to improve water protecting property and lithium ion conductivity.

In addition, detailed description of the hydrophobic polymer, ion conductive polymer, binder and the polymer layer is the same as described above.

Meanwhile, in still another aspect, there is provided a cable-type secondary battery including the anode. Referring to FIG. 5, the cable-type secondary battery 100 according to the present disclosure includes: an internal electrode 10 extended along the longitudinal direction; a separator layer 20 formed to surround the internal electrode; and an external electrode 30 formed to surround the outer surface of the separator layer, wherein any one of the internal electrode and the external electrode is the anode as described above.

According to the present disclosure, when the internal electrode 10 is an anode, the anode is a linear wire-type anode (FIG. 5) or a wound wire-type anode (FIG. 6) having an open structure.

As used herein, the term 'open structure' refers to a structure which has the open structure as a boundary surface and allows free mass transfer from the inside to the outside through the boundary surface.

The open structure has a space therein, and the space may include an internal electrode core portion.

The internal electrode core portion may be made of carbon nanotubes, stainless steel, aluminum, nickel, titanium, baked carbon or copper; stainless steel surface-treated with carbon, nickel, titanium or silver; aluminum-cadmium alloy; a non-conductive polymer surface-treated with a conductive material; or a conductive polymer.

In addition, the space formed inside of the open structure may include a lithium ion-supplying core portion including an electrolyte.

Since the internal electrode according to the present disclosure has an open structure, the electrolyte of the lithium ion-supplying core portion may be arrived at the external electrode through the internal electrode. In other words, the cable-type secondary battery according to an embodiment of the present disclosure may be provided with a lithium ion-supplying core portion containing an electrolyte to allow easy infiltration to an electrode active material so that supply and exchange of lithium ions may be facilitated. As a result, it is possible to provide the battery with excellent capacity characteristics and cycle characteristics.

The lithium ion-supplying core portion includes an electrolyte. Although there is no particular limitation in the electrolyte, it is preferred to use a non-aqueous electrolyte using ethylene carbonate (EC), propylene carbonate (PC), butylene carbonate (BC), vinylene carbonate (VC), diethyl carbonate (DEC), dimethyl carbonate (DMC), ethyl methyl carbonate (EMC), methyl formate (MF), γ-butyrolactone, sulfolane, methyl acetate (MA) or methyl propionate (MP); a gel polymer electrolyte using PEO, PVdF, PVdF-HFP, PMMA, PAN or PVAc; a solid electrolyte using PEO, polypropylene oxide (PPO), polyethylene imine (PEI), polyethylene sulfide (PES) or polyvinyl acetate (PVAC); or the like. In addition, the electrolyte may further include a lithium salt, such as LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, (CF$_3$SO$_2$)$_2$NLi, lithium chloroborate, lithium lower aliphatic carboxylate or lithium tetraphenylborate. In addition, the lithium ion-supplying core portion may include an electrolyte alone. In the case of a liquid electrolyte, a porous carrier may be used.

In addition, a filler core portion may be formed in the space provided in the open structure.

The filler core portion may include, besides to the ingredients forming the internal electrode core portion and lithium ion-supplying core portion, various ingredients for improving various properties of a flexible secondary battery. Such ingredients may include polymer resins, rubber, inorganic materials, or the like, which may have various shapes, such as a wire shape, fibrous shape, powdery shape, mesh or foam.

In addition, two or more such anodes may be twisted spirally so that they may cross each other.

Figure 7:
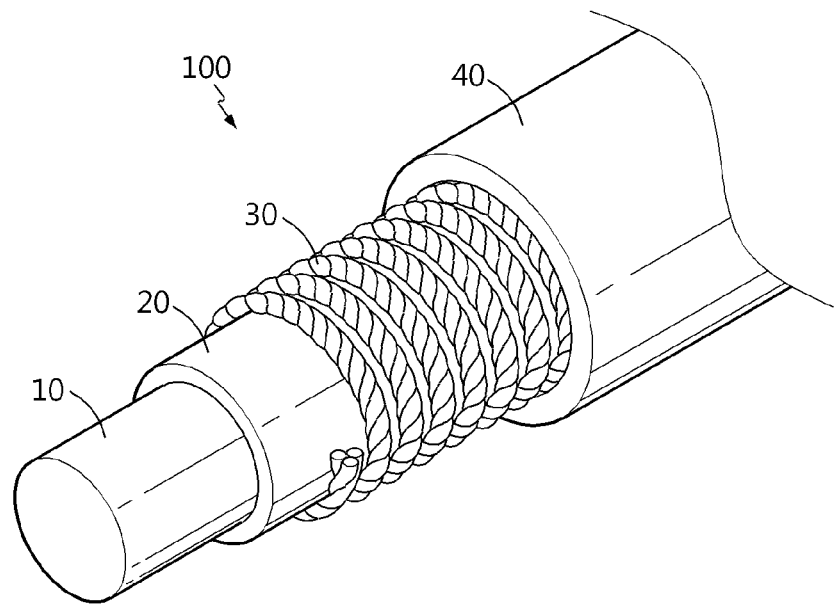
FIG. 7 is a schematic view illustrating a cable-type secondary battery wherein the anode according to an embodiment of the present disclosure is used as an external electrode in the form of a wound wire-type anode.
Figure 8:
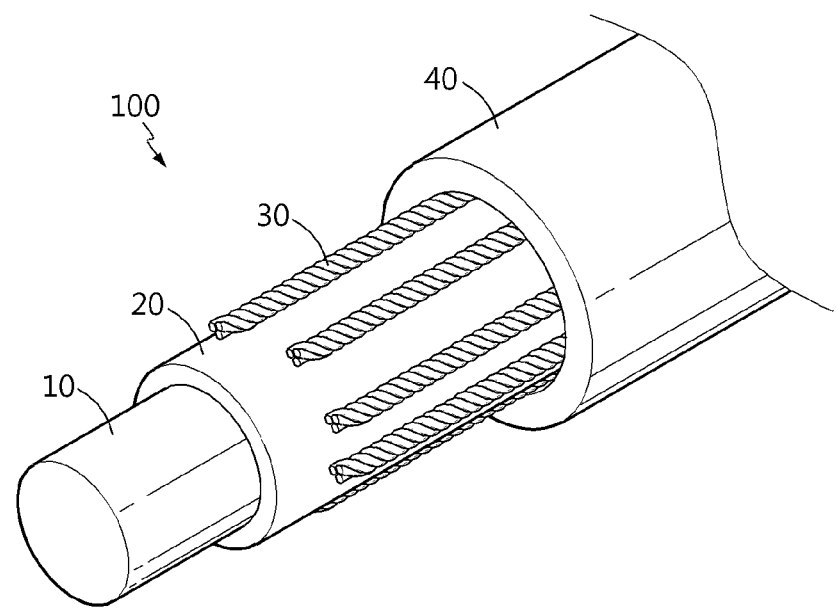
FIG. 8 is a schematic view illustrating a cable-type secondary battery wherein two or more anodes according to an embodiment of the present disclosure are used as external electrodes in parallel with each other in the longitudinal direction.

According to the present disclosure, when the external electrode 30 is an anode, the anode may be wound spirally at the outside of the separator layer (FIG. 7), or two or more such anodes may be disposed in parallel with each other at the outside of the separator layer along the longitudinal direction (FIG. 8).

Further, the external electrode 30 may be provided with a protective coating 40 at the outside thereof, and the protective coating is an insulating body and may be formed to surround the outer surface of the cathode current collector in order to protect the electrode from the ambient moisture and external impact. The protective coating may include a conventional polymer resin, such as PVC, HDPE or an epoxy resin.

According to the present disclosure, the separator layer 20 may be an electrolyte layer or separator.

The electrolyte layer functioning as an ion channel may include a gel polymer electrolyte using PEO, PVdF, PVdF-HFP, PMMA, PAN or PVAc; or a solid electrolyte using polyethylene oxide (PEO), polypropylene oxide (PPO), polyethylene imine (PEI), polyethylene sulfide (PES) or polyvinyl acetate (PVAc).

The electrolyte layer may further include a lithium salt in order to improve ion conductivity and reaction rate. The lithium salt may be selected from LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, chloroborane lithium, lower aliphatic lithium carboxylate, lithium tetraphenylborate and a combination thereof.

Although there is no particular limitation, the separator may be a porous polymer substrate made of a polyolefin polymer selected from the group consisting of an ethylene homopolymer, propylene homopolymer, ethylene-butene copolymer, ethylene-hexene copolymer and ethylene-methacrylate copolymer; a porous polymer substrate made of a polymer selected from the group consisting of polyester, polyacetal, polyamide, polycarbonate, polyimide, polyetherether ketone, polyether sulfone, polyphenylene oxide, polyphenylene sulfide and polyethylene naphthalate; a porous substrate formed of a mixture of inorganic particles and a binder polymer; a separator including the porous polymer substrate, at least one surface of which is provided with a porous coating layer formed of a mixture of inorganic particles and a binder polymer; or the like.

According to the present disclosure, when the internal electrode is a cathode, it may include a current collector and an electrode layer surrounding the outer surface thereof. When the external electrode is a cathode, it may include an electrode layer and a current collector surrounding the outer surface thereof. The electrode layer may include, as an active material, any one type of active material particles selected from the group consisting of Li, $LiCoO_2$, $LiNiO_2$, $LiMn_2O_4$, $LiCoPO_4$, $LiFePO_4$, $LiNiMnCoO_2$ and $LiNi_{1-x-y-z}Co_xM1_yM2_zO_2$ (wherein each of M1 and M2 independently represents any one selected from the group consisting of Al, Ni, Co, Fe, Mn, V, Cr, Ti, W, Ta, Mg and Mo, each of x, y and z independently represents an atomic proportion of an element forming the oxides, and $0 \leq x < 0.5$, $0 \leq y < 0.5$, $0 \leq z < 0.5$, $0 < x+y+z \leq 1$), or a mixture of two or more of them. The current collector may be made of stainless steel, aluminum, nickel, titanium, baked carbon or copper; stainless steel surface-treated with carbon, nickel, titanium or silver; aluminum-cadmium alloy; a non-conductive polymer surface-treated with a conductive material; a conductive polymer; metal paste including metal powder which is Ni, Al, Au, Pd/Ag, Cr, Ta, Cu, Ba or ITO; or carbon paste containing carbon powder which is graphite, carbon black or a carbon nanotube.

MODE FOR DISCLOSURE

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Examples 1 to 3

Lithium metal as an active material was coated on a wire-type current collector made of copper and having a diameter of 125 μm through an electroplating process to form a lithium-containing electrode layer.

Meanwhile, polydimethylsiloxane (PDMS, SYLGARD 184) as a hydrophobic polymer and a silicone-based curing agent (available from Shinetsu Co., CAT-RG) as a curing agent were mixed in acetone as a solvent, wherein the curing agent was used in an amount of 1.1 parts by weight based on 100 parts by weight of the hydrophobic polymer. In addition, polyvinylidene fluoride-hexafluoropropylene (PVDF-HFP) as an ion conductive polymer was added to the resultant mixture on the content as shown in the following Table 1 (based on the total weight of PDMS and PVDF-HFP) to obtain a mixed solution (solid content: 5 wt %) of the hydrophobic polymer with the ion conductive polymer.

The content of each ingredient is shown in Table 1.

After agitating the solution, a polymer layer of the mixture of the hydrophobic polymer with the ion conductive polymer was coated on one surface of a PET release film by using a doctor blade to a thickness of 0.1 μm, followed by drying, to prepare a transfer film.

Then, the outer surface of the previously formed lithium-containing electrode layer was surrounded spirally with the transfer film so that the outer surface may be in contact with the polymer layer. After that, a tetra-lateral press was used to carry out pressing of the outside of the transfer film (80° C., 1 kg/cm$^2$) from four sides to transfer the polymer layer of the polymer mixture to the lithium-containing electrode layer.

Then, the PET film as a release film was removed to obtain an anode for a cable-type secondary battery having the polymer layer on the lithium-containing electrode layer surrounding the wire-type current collector.

The obtained anode for a cable-type secondary battery was evaluated for the following characteristics. The results are shown in Table 1.

Comparative Example 1

Lithium metal as an active material was coated on a wire-type current collector made of copper and having a diameter of 125 μm through an electroplating process to form a lithium-containing electrode layer.

After forming a lithium-containing electrode on the wire-type current collector, polydimethylsiloxane (PDMS, SYLGARD 184) as a hydrophobic polymer and a silicone-based curing agent (available from Shinetsu Co., CAT-RG) as a curing agent were mixed in acetone as a solvent, wherein the curing agent was used in an amount of 1.1 parts by weight based on 100 parts by weight of the hydrophobic polymer. In addition, polyvinylidene fluoride-hexafluoropropylene (PVDF-HFP) as an ion conductive polymer was added to the resultant mixture on the content as shown in the following Table 1 (based on the total weight of PDMS and PVDF-HFP) to obtain a mixed solution (solid content: 5 wt %) of the hydrophobic polymer with the ion conductive polymer.

Then, the wire-type current collector having the lithium-containing electrode layer was dipped in the solution of the polymer mixture to carry out dip coating to form a polymer layer having a thickness of 0.1 μm on the outer surface of the lithium-containing electrode layer, thereby providing an anode for a cable-type secondary battery.

The obtained anode for a cable-type secondary battery was evaluated for the following characteristics. The results are shown in Table 1.

Comparative Examples 2 to 3

An anode for a cable-type secondary battery was obtained in the same manner as Example 1, except that the content of the mixed solution of the hydrophobic polymer with the ion conductive polymer was controlled as shown in Table 1.

Test Example 1: Evaluation for Stability Against Moisture

Each of the anodes for a cable-type secondary battery according to Examples 1 to 3 and Comparative Example 1 to 3 was allowed to stand in the air at 25° C. under a relative humidity (RH) of 40%. Then, the degree of surface oxidation of each lithium-containing electrode layer caused by moisture was observed to evaluate the stability against moisture.

<Evaluation Criteria>
Δ: oxidized within 3 hours
○: oxidized with 6 hours
◎: not oxidized even after 6 hours Test Example 2: Determination of Lithium Ion Conductivity Each of the anodes for a cable-type secondary battery according to Examples 1 to 3 and Comparative Example 1 to 3 was used as an anode, and a wire-type lithium metal electrode having the same shape as the anode was used as a cathode. A polyethylene (PE) separator was interposed between the anode and the cathode to obtain an electrode assembly. Then, the electrode assembly was introduced into a battery casing and a non-aqueous electrolyte containing 1M $LiPF_6$ added to a non-aqueous solvent including ethylene carbonate/diethyl carbonate at a volume ratio of 1/2 was injected thereto to obtain a wire-type symmetric cell.

The obtained symmetric cell was used to determine the lithium ion conductivity by using a conductivity measuring instrument, such as Inolab 731.

TABLE 1

| | Content of PDMS[1] (wt %) | Content of PVDF-HFP[2] (wt %) | Solvent:hydrophobic polymer:ion conductive polymer:curing agent (wt %) | Stability against moisture | Lithium ion conductivity |
|---|---|---|---|---|---|
| Ex. 1 | 10 | 90 | 94.98:0.5:4.5:0.02 | Δ | $5.5 * 10^{-3}$ |
| Ex. 2 | 30 | 70 | 94.98:1.5:3.5:0.02 | ○ | $9.1 * 10^{-3}$ |
| Ex. 3 | 50 | 50 | 94.98:2.5:2.5:0.02 | ◎ | $2.0 * 10^{-3}$ |
| Comp. Ex. 1 | 10 | 90 | 94.98:0.5:4.5:0.02 | Δ | Not available due to oxidation of Li metal caused by solvent |
| Comp. Ex. 2 | 100 | 0 | 94.98:5:0:0.02 | ◎ | $1 * 10^{-7}$ |
| Comp. Ex. 3 | 0 | 100 | 94.98:0:5:0.02 | x | $1 * 10^{-3}$ |

[1][2]content of PDMS and content of PVDF-HFP based on the total amount thereof

As can be seen from Table 1, Examples 1 to 3, wherein a polymer layer including a hydrophobic polymer and an ion conductive polymer is formed on a lithium-containing electrode layer by using tetra-lateral pressing during the manufacture of a wire-type anode, satisfy both of the two characteristics of stability against moisture and lithium ion conductivity to a desired level.

On the contrary, although Comparative Example 1 including a polymer layer formed by dip coating has stability against moisture equal to that of Example 1, it does not allow determination of lithium ion conductivity, because acetone used as a solvent reacts with lithium metal to cause oxidation of lithium metal.

In addition, in the case of Comparative Example 2, it shows high stability against moisture hut shows significantly lower lithium ion conductivity as compared to Examples 1 to 3. In the case of Comparative Example 3, it maintains lithium ion conductivity similar to the lithium ion conductivity of Examples 1 to 3 but shows significantly low stability against moisture.

What is claimed is:

1. A method for manufacturing an anode for a cable-type secondary battery, comprising the steps of:
   forming a lithium-containing electrode layer on the outer surface of a wire-type current collector; and
   surrounding the outer surface of the lithium-containing electrode layer with a spirally wound substrate for forming a polymer layer, and tetra-lateral pressing the outside of the substrate for forming a polymer layer to form a polymer layer on the lithium-containing electrode layer,
   wherein the polymer layer comprises a hydrophobic polymer, an ion conductive polymer, and a binder for binding the hydrophobic polymer and the ion conductive polymer with each other,
   wherein the wire-type current collector is rotated around a longitudinal direction of the wire-type current collector while carrying out the tetra-lateral pressing, and
   wherein the tetra-lateral pressing is carried out by co-rotating one or more press members that are in contact with the outside of the substrate for forming the polymer layer.

2. A method for manufacturing an anode for a cable-type secondary battery, comprising the steps of:
   forming a lithium-containing electrode layer on the outer surface of a wire-type current collector;
   surrounding the outer surface of the lithium-containing electrode layer with a spirally wound transfer film, wherein the transfer film has a release film and a polymer layer formed on one surface of the release film, and the polymer layer is in contact with the outer surface the lithium-containing electrode layer;
   tetra-lateral pressing the outside of the transfer film to transfer the polymer layer to the lithium-containing electrode layer; and
   removing the release film,
   wherein the polymer layer comprises a hydrophobic polymer, an ion conductive polymer, and a binder for binding the hydrophobic polymer and the ion conductive polymer with each other,
   wherein the wire-type current collector is rotated around a longitudinal direction of the wire-type current collector while carrying out the tetra-lateral pressing, and
   wherein the tetra-lateral pressing is carried out by co-rotating one or more press members that are in contact with the outside of the transfer film for forming the polymer layer.

3. The method for manufacturing an anode for a cable-type secondary battery according to claim 1, wherein the substrate for forming a polymer layer is a transfer film having a release film and a polymer layer formed on one surface of the release film; or a polymer layer film.

4. The method for manufacturing an anode for a cable-type secondary battery according to claim 1, wherein one or more press members are spaced apart from each other at the same interval.

5. The method for manufacturing an anode for a cable-type secondary battery according to claim 1, wherein the pressing is carried out at a temperature of 80-100° C. under a pressure of 1.0-1.5 kg/cm$^2$.

6. The method for manufacturing an anode for a cable-type secondary battery according to claim 1, wherein the polymer layer has a thickness of 0.1-20 μm.

7. The method for manufacturing an anode for a cable-type secondary battery according to claim 1, wherein the weight ratio of the hydrophobic polymer to the ion conductive polymer is 10:90 to 90:10.

8. The method for manufacturing an anode for a cable-type secondary battery according to claim 1, wherein the binder is used in an amount of 0.1-2 parts by weight based on 100 parts by weight of the total weight of the polymer layer.

9. The method for manufacturing an anode for a cable-type secondary battery according to claim 1, wherein the hydrophobic polymer is selected from polydimethylsiloxane (PDMS), polyacrylonitrile (PAN), polytetrafluoroethylene (PTFE), polychlorotrifluoroethylene (PCTFE) and a combination thereof.

10. The method for manufacturing an anode for a cable-type secondary battery according to claim 1, wherein the ion conductive polymer is selected from polyvinylidene fluoride-hexafluoropropylene (PVDF-HFP), polyvinyl fluoride (PVF), polyvinylidene fluoride (PVDF), polymethyl methacrylate (PMMA), polyethylene oxide (PEO) and a combination thereof.

11. The method for manufacturing an anode for a cable-type secondary battery according to claim 2, wherein the release film is made of polyethylene terephthalate (PET).

12. A cable-type secondary battery, comprising:
an internal electrode extended along a longitudinal direction;
a separator layer formed to surround the internal electrode; and
an external electrode formed to surround the outer surface of the separator layer,
wherein the external electrode is the anode manufactured by the method for manufacturing an anode for a cable-type secondary battery according to claim 1,
wherein two or more external electrodes are disposed in parallel with each other on the outside of the separator layer in the longitudinal direction.

* * * * *